US011635756B2

(12) United States Patent
Modolo

(10) Patent No.: US 11,635,756 B2
(45) Date of Patent: Apr. 25, 2023

(54) AUTONOMOUS FORKLIFT TRUCK CONTROL SYSTEM AND METHOD FOR DRIVNG THE FORKLIFT TRUCK

(71) Applicant: COMPAGNIE GENERALE DES ETABLISSEMENTS MICHELIN, Clermont-Ferrand (FR)

(72) Inventor: Ivan Modolo, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 522 days.

(21) Appl. No.: 16/626,030

(22) PCT Filed: Jun. 21, 2018

(86) PCT No.: PCT/FR2018/051600
§ 371 (c)(1),
(2) Date: Dec. 23, 2019

(87) PCT Pub. No.: WO2019/002783
PCT Pub. Date: Jan. 3, 2019

(65) Prior Publication Data
US 2020/0133265 A1 Apr. 30, 2020

(30) Foreign Application Priority Data
Jun. 29, 2017 (FR) ...................... 1755998

(51) Int. Cl.
G05D 1/00 (2006.01)
B60W 50/035 (2012.01)
(Continued)

(52) U.S. Cl.
CPC ......... G05D 1/0061 (2013.01); B60W 50/035 (2013.01); B66F 9/063 (2013.01);
(Continued)

(58) Field of Classification Search
CPC ..... B60W 50/035; B66F 9/063; B66F 9/0755; B66F 9/0759; B66F 9/24; B66F 9/20; G05D 1/0061; G05D 2201/0216
See application file for complete search history.

(56) References Cited

U.S. PATENT DOCUMENTS 4,077,486 A  3/1978 Blakeslee et al.
5,257,177 A 10/1993 Bach et al.
(Continued)

FOREIGN PATENT DOCUMENTS

EP  1 138 868 A1  10/2001
EP     2495145 A   9/2012
(Continued)

OTHER PUBLICATIONS

Tanasak Samakwong et al., PID Controller Design for Electrohydraulic Servo Valve System with Genetic Algorithm, 2016, 2016 International Electrical Engineering Congress, iEECON2016, Mar. 2-4, 2016, Chiang Mai,Thailand, p. 91-94 (Year: 2016).*

(Continued)

Primary Examiner — Tyler J Lee
Assistant Examiner — Yufeng Zhang
(74) Attorney, Agent, or Firm — Venable LLP

(57) ABSTRACT

A control system for a lift truck comprises: human-control devices generating manual-guidance signals for actuators of the vehicle, said devices including a hydraulic steering system, a control module (1) including an automatic-control submodule generating autonomous-guidance signals intended for one or more actuators of the vehicle, depending on setpoint signals, a switching module (2) designed to select one or more manual guidance signals and/or one or more autonomous-guidance signals, and an electrohydraulic valve enabling the conversion of a guidance signal stemming from the automatic-control module into a signal (Continued)

intended for the hydraulic steering system The system includes, in addition, a servo controller of the electrohydraulic valve, comprising a proportional-integral controller, an on/off controller and means for activation of one or other of the PI and ON/OFF controllers, depending on a speed threshold of the lift truck.

13 Claims, 1 Drawing Sheet

(51) Int. Cl.
*B66F 9/06* (2006.01)
*B66F 9/075* (2006.01)
*B66F 9/24* (2006.01)

(52) U.S. Cl.
CPC .......... *B66F 9/0755* (2013.01); *B66F 9/0759* (2013.01); *B66F 9/24* (2013.01); *G05D 2201/0216* (2013.01)

(56) References Cited

U.S. PATENT DOCUMENTS

| | | | |
|---|---|---|---|
| 5,469,356 A * | 11/1995 | Hawkins | G05D 1/0038 318/591 |
| 5,890,545 A * | 4/1999 | Smith | A01B 25/00 172/620 |
| 8,694,194 B2 | 4/2014 | Waltz et al. | |
| 9,002,626 B2 | 4/2015 | Waltz et al. | |
| 9,399,472 B2 | 7/2016 | Minoiu-Enache | |
| 2004/0024504 A1 * | 2/2004 | Salib | B62D 7/159 701/38 |
| 2012/0226420 A1 | 9/2012 | Bauer et al. | |
| 2013/0054076 A1 * | 2/2013 | Waltz | G05D 1/0061 701/1 |
| 2014/0032017 A1 | 1/2014 | Anderson et al. | |
| 2014/0188324 A1 | 7/2014 | Waltz et al. | |
| 2014/0240117 A1 | 8/2014 | McKernan et al. | |
| 2015/0134178 A1 | 5/2015 | Minoiu-Enache | |
| 2016/0090283 A1 * | 3/2016 | Svensson | B66F 9/0755 701/50 |
| 2016/0264387 A1 | 9/2016 | Yoon et al. | |
| 2018/0356817 A1 * | 12/2018 | Poeppel | H04L 67/306 |
| 2020/0122989 A1 | 4/2020 | Nunes Espirito Santo | |

FOREIGN PATENT DOCUMENTS

| | | |
|---|---|---|
| EP | 3 061 719 A1 | 8/2016 |
| FR | 2 667 367 A1 | 4/1992 |
| JP | 2000-185534 A | 7/2000 |
| JP | 2001-226095 A | 8/2001 |
| WO | 2013/033179 A1 | 3/2013 |
| WO | 2013/150244 A1 | 10/2013 |

OTHER PUBLICATIONS

International Search Report dated Nov. 20, 2018, in corresponding PCT/FR2018/051600 (8 pages).

* cited by examiner

AUTONOMOUS FORKLIFT TRUCK CONTROL SYSTEM AND METHOD FOR DRIVNG THE FORKLIFT TRUCK

FIELD OF THE INVENTION

The invention concerns a control system for an autonomous forklift truck, and a method for guidance of such a truck. More precisely, the invention concerns a control system for a forklift truck that is normally intended to operate in manual mode.

A manual lift truck is designed to be driven by a truck-driver having a suitable license. In fact, the driving and handling of such a vehicle and of its various accessories requires specific training. In this way, the driver learns how to handle the vehicle, to use the forks for the transportation of equipment, and to abide by all the safety rules relating to the environment in which he/she is maneuvering.

In order to remedy these drawbacks, entirely autonomous lift trucks have appeared on the market. These trucks, intended for the transportation of goods with complete autonomy, are relatively expensive and offer only a possibility of use in an autonomous mode, which may turn out to be limiting for certain uses.

From application WO 2013/150244, vehicles are also known that are generally intended to operate in manual mode and that are suitable to permit a second mode of operation in automatic mode. In this way, it becomes possible to realize numerous services, such as a valet service, a parking service etc. However, this document only concerns passenger vehicles and does not take into account the distinctive characteristics of a forklift truck or of a environment for maneuvering such as a factory.

In addition, a lift truck has the distinctive characteristic of being equipped with a hydraulic steering system, enabling a guidance of the swivelling of the wheels directly from the steering-wheel. Within the context of the autonomous operation of a lift truck, it is therefore advisable to take an interest in this aspect also.

The present invention therefore aims to propose a control system for a lift truck that enables the aforementioned factors to be complied with. As a preamble, it is specified here that the terms "truck", "lift truck" and "forklift truck" will be used indiscriminately in this text with the same meaning.

SUMMARY OF THE INVENTION

The invention thus concerns a control system for a lift truck, comprising:
human-control devices generating manual-guidance signals for actuators of the vehicle, said devices including a hydraulic steering system,
a module for detecting the environment of the vehicle,
a navigation module enabling guidance setpoint signals to be generated, depending on a received instruction,
a control module including an automatic-control submodule generating autonomous-guidance signals intended for one or more actuators of the vehicle, depending on the setpoint signals and on the information stemming from the detection module,
an assisted-control module generating corrected manual guidance signals depending on the manual guidance signals and on the information stemming from the detection module and/or on the guidance setpoint signals,
a switching module designed to select one or more manual guidance signals and/or corrected manual guidance signals and/or one or more autonomous-guidance signals,
an electrohydraulic valve enabling the transformation of a guidance signal stemming from the automatic-control module into a signal intended for the hydraulic steering system,
the system being characterized in that it includes, in addition, a servo controller of the electrohydraulic valve, comprising a proportional-integral controller, an on/off controller and means for activation of one or other of the PI and ON/OFF controllers, depending on a speed threshold of the lift truck.

The use of two different controllers aims to reduce the servo idle-times to a minimum by anticipating the control as far as possible.

In fact, each of these controllers has advantages and disadvantages, and the aim is therefore to optimize the regulation by taking advantage of the two types of controller:

A PI controller enables a regulation to be carried out with greater precision, but it is relatively slow and therefore cannot be used beyond a certain speed threshold. In fact, a PI controller induces a delay-time, and it is an advantage to be able to eliminate such a delay.

An ON/OFF controller, on the other hand, offers a higher speed of reaction, making it a good tool for regulation at high speed.

In addition, the choice is made between a proportional (PI) controller and an on/off (ON/OFF) controller, depending on a speed threshold of the truck. In a preferred example At low speed, for example below a threshold of 2 m/s, the proportional (PI) controller is selected: the precision of regulation is favoured, the gains are suitable for good operation within this speed range, At high speed, for example above the threshold of 2 m/s, the on/off (ON/OFF) controller is selected: the speed of reaction to a change of sign is favoured; this enables a better servo precision to be obtained at high speed by reducing the delay-times of the control loop to a minimum.

In a preferred embodiment, a system according to the invention includes, in addition:
a module for detecting the environment of the vehicle,
a navigation module enabling guidance setpoint signals to be generated, depending on a received instruction,
and in which
the control module includes an assisted-control submodule generating corrected manual guidance signals depending on the manual guidance signals and on the information stemming from the detection module and/or on the guidance setpoint signals, and
the switching module is designed, in addition, to select corrected manual signals.

The invention also concerns a lift truck provided with a control system according to the invention. All of the characteristics that will be described below may therefore concern the control system alone or the truck provided with the control system.

In a preferred embodiment, the switching module selects the guidance signals, depending on four modes of operation:
a manual mode in which only the manual signals are selected,
a completely automatic mode in which only the autonomous signals are selected, a manual mode with assisted security, in which the manual guidance signals corrected by the information stemming from the detection module are selected, a manual mode with assisted navigation, in which the manual-guidance signals corrected by the guidance setpoint signals are selected.

This switching module is advantageously actuated via a selector installed in the lift truck. In this way, even in the case where an operator might wish to drive the truck himself/herself, a control system according to the invention enables the equipment installed to be taken advantage of for the automation of the truck, in order to offer driving assistance and in this way to facilitate the work of the operator and to heighten the safety of the displacements of the truck.

In a preferred embodiment, the switching module also enables a maintenance mode to be chosen, in which all of the elements of the control system, with the exception of the human-control devices, are deactivated, in particular by a physical disconnection. This enables, for example, an original manufacturer of the manual lift truck to be able to intervene for maintenance actions without being hampered by the additional elements of the control system.

In another preferred embodiment, the navigation module includes one or more of the following elements:

geolocation means, enabling the position of the lift truck to be known in real time, telecommunication means in send mode, enabling, for example, the geolocation information to be transmitted to a general management system, so that a supervisor knows the position of various trucks in a factory at any instant.

telecommunication means in receive mode, enabling reception of setpoints concerning a trajectory to be travelled to be received, or actions to be carried out—such as, for example, an action to fetch material at a point A in order afterwards to unload it at a point B. Proceeding from these received elements, the navigation module can then generate guidance setpoint signals. These setpoint signals advantageously comprise one or more setpoints from: a setpoint for speed, a setpoint for angle of rotation of the wheels of the truck, a setpoint for elevation of the forks, a setpoint for angle of inclination of the forks, a setpoint for separation of the forks.

As pointed out previously, the guidance signals that will actually be transmitted to the actuators are determined as a function of these setpoint signals, determined by the navigation module, but also taking into account additional parameters stemming from the detection module.

In this way, in a first embodiment, the environment-detection module includes a fork-management submodule, which comprises:

sensors for detecting the presence of loading on the forks, fork-position sensors.

The guidance signals will vary in accordance with the state of the forks (raised or lowered, full or empty). For example, a lift truck having forks that are loaded cannot in fact move around at the same speed as an empty truck. In the same way, a lift truck having forks in a high position cannot move around at the same speed, or take corners the same way, as a truck having forks in a low position. These elements stemming from the detection module then enable the setpoint signals to be corrected, in order to make them compatible with the safety requirements for the environment of the truck.

In another embodiment, the fork-management submodule includes means for detecting an inconsistency in the level of loading of the forks and for emitting a stop signal in case of inconsistency. In fact, if the fork-management submodule detects a fall of the objects loaded on the forks, or a poor centring of these objects, it is necessary to halt the movement of the truck immediately, so as to avoid accidents. In this case, the stop signal is then transmitted to the control module, so that it generates corresponding guidance signals, namely emergency-stop guidance signals.

In another embodiment, the environment-detection module includes a submodule for detecting protection zones, including at least one laser enabling the presence of an obstacle in a zone surrounding the vehicle to be detected.

In fact, a lift truck manoeuvres in a constrained environment such as a factory or a storage warehouse, and it therefore has to take the various obstacles—material or human—into account, so as to avoid any collision that could damage the equipment and endanger the operators working in the environment of the truck. These elements then, as previously, enable the setpoint signals to be corrected, in order to take the environment into account.

In the same way, the human-control devices are those generally installed in commercial lift trucks and included in the group comprising: an accelerator pedal, a brake pedal, a steering-wheel, a selector for the direction of travel of the vehicle, a lever for controlling the elevation, the inclination and the separation of the forks.

Thanks to the entirety of the elements of this control system, a lift truck according to the invention can move over degraded or uneven ground, without any problem for the transportation of pallets and reels, at speeds up to 4 m/s. In fact, the presence of the safety systems, by virtue of the environment-detection module, enables the speed to be increased without any risk for the surroundings of the truck, since it is known that, in case of a problem, the safety systems will come into operation. Such a truck therefore makes it possible to gain in productivity while guaranteeing safety in the factory or the warehouse, and it does this at a reasonable cost, since elements can be added to an existing truck without making substantial modifications to the basic architecture of the truck.

Generally, all of the functionalities that have just been described in the form of modules may be physically distributed in a different way and managed by shared or separate electronics.

BRIEF DESCRIPTION OF THE FIGURES

Other objects and advantages of the invention will become clear in the following description of a preferred but non-limiting embodiment, illustrated by the following figures in which.

DETAILED DESCRIPTION

Figure 1:
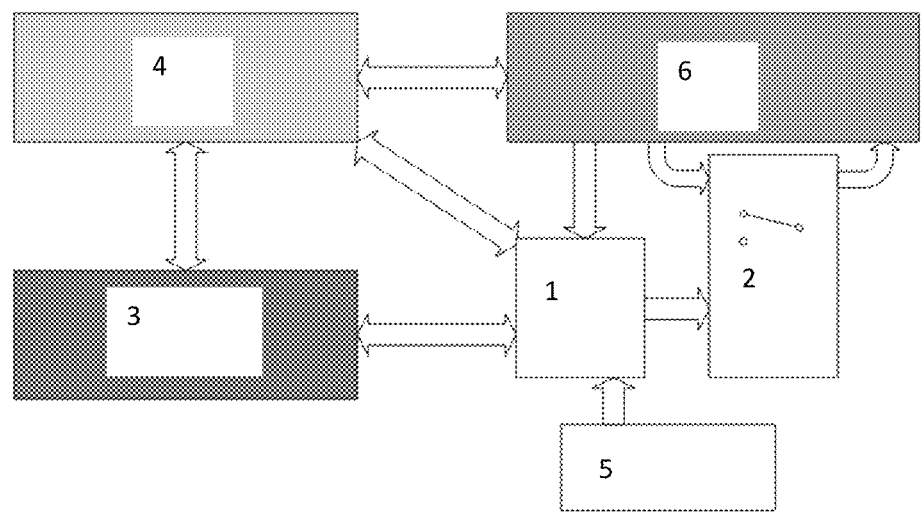
FIG. 1 shows a block diagram of a control system according to the invention.

FIG. 1 shows a control module 1 which comprises a set of electronic circuits making it possible to generate autonomous-guidance signals or corrected manual guidance signals.

The guidance signals generated in this way are transmitted to the switching module 2 which selects the signals actually to be transmitted to the actuators 6 of the vehicle. This switching module will be described in detail with the aid of FIG. 2.

The control module 1 receives, at its input, setpoint signals stemming from the navigation module 3. These setpoint signals include, in particular, a speed signal and a steering-angle signal for the truck, which is converted into a signal for actuation of the steering-wheel. The setpoint signals also include signals for the management of the forks, in particular the height, the inclination and the separation of the forks.

The navigation module 3 includes geolocation means and also includes a memory in which a map is stored of the place in which the truck is intended to manoeuvre, for example a factory or a warehouse. The map can be loaded directly into the memory from an external source, but it can also be established directly by the navigation module, by learning at the time of the first displacements of the truck in a place to be mapped.

The navigation module includes, in addition, means for receiving data stemming from a remote server, for example by Wi-Fi. These received data correspond to tasks to be carried out by the truck, and include, for example, the identification of routes to be followed, or of goods to load and unload. In order to do this, the navigation module 3 also receives information from the detection module 4. This detection module enables, for example, the navigation module to be informed as to the presence of obstacles in the environment of the truck, or as to the position of the forks.

This detection module 4 also communicates directly with the control module 1, for example in order to correct guidance setpoints as a function of external parameters which might not have been taken into account by the navigation module and which may call the safety of the truck or of the operators into question.

The control module 1 also receives information from a set of sensors 5, for example from the sensors enabling an anomaly regarding of the load to be detected. Upon reception of this type of information, a procedure for an emergency stop of the truck could then be activated. This emergency procedure consists, for example, in acting serially on an emergency-stop button which is initially present in the lift truck, resulting in the shutdown of the power supply of the truck and in the stopping of the truck by a relaxation of the pressure on the multidisc brakes. In this way, the emergency procedure acts exactly as if an operator had pressed the emergency button.

Figure 2:
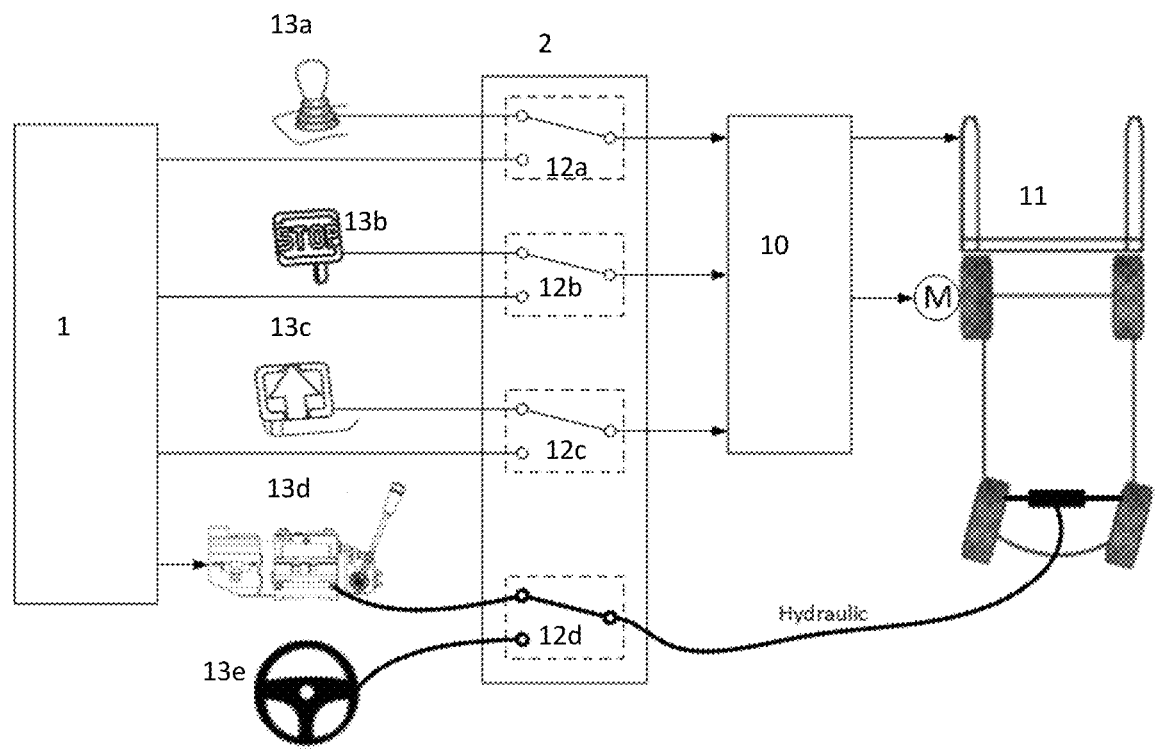
FIG. 2 enables the operation of the switching module of a system according to the invention to be explained in detail.

We are now going to describe the switching module in detail with the aid of FIG. 2. This switching module is connected to the electrical interface 10 of the truck 11. This interface is the one originally present in the truck 11, and it is linked to all of the actuators and sensors originally present in the truck.

The switching module is linked to a selector installed in the truck, making it possible to choose the mode of operation.

The switching module comprises a set of switches 12a, 12b, 12c, 12d etc., which make it possible to switch between the signals stemming directly from the human-control devices and the signals stemming from the control module 1.

There can be seen a switch for the handles 13a of the truck that make it possible to choose the direction of travel of the truck and also to guide the operation of the forks in manual mode.

There can also be seen a switch for the brake pedal 13b, one for the accelerator pedal 13c, and one for the steering-wheel 13e.

It will be noted in this figure that the case of the steering-wheel is special, since the electrical guidance signals for the steering angle have to be converted into hydraulic signals and transmitted directly to the truck 11 by way of a hydraulic connection. In order to do this, a control system according to the invention advantageously includes a hydraulic valve 13d enabling the conversion of the signals.

According to the mode of operation chosen, with the aid of a selector installed in the vehicle, one or more of these elements is/are activated or deactivated, in the following way:

Switching Module in Manual Mode:
Control module: deactivated
Navigation module: deactivated
Detection module: deactivated
Emergency-stop procedure: activated
In this case, the switching module will select the signals stemming directly from the human-control devices, in order to transmit them to the electrical interface 10. The switches will therefore be in the position shown in FIG. 2.

Switching Module in Manual Mode with Assisted Security
Control module: activated
Navigation module: deactivated
Detection module: activated
Emergency-stop procedure: activated
In this case, the switching module will select the manual signals, corrected as a function of the information stemming from the detection module. The switches will therefore be in the position shown in FIG. 2.

Switching Module in Manual Mode with Assisted Navigation:
Control module: activated
Navigation module: activated
Detection module: deactivated
Emergency-stop procedure: activated
In this case, the switching module will select the manual signals, corrected as a function of the information stemming from the navigation module. The switches will therefore be in the position shown in FIG. 2.

Completely Autonomous Mode
Control module: activated
Navigation module: activated
Detection module: activated
Emergency-stop procedure: activated
In this case, the switching module will select the autonomous signals stemming from the control module 1.

On reading this description, it will be noted that a system according to the invention is very easy to install in an existing lift truck, since the additional modules will interface easily with the existing electrical and electronic architecture. In addition, such a control system advantageously utilises the sensors, buttons, selectors etc. already present in the truck, further reducing the costs induced by the fitting-out of existing trucks.

Generally, a system according to the invention makes it possible to convert a manual lift truck easily and at moderate cost into an autonomous lift truck while abiding by the safety constraints due to the specific environment in which such trucks need to manoeuvre.

The invention claimed is:

1. A control system for a lift truck vehicle, the control system being mounted on the lift truck vehicle and comprising:

human-control devices generating manual guidance signals for one or more actuators of the vehicle, the human-control devices including a hydraulic steering system;

a control module including an automatic-control submodule generating autonomous guidance signals intended for the one or more actuators of the lift truck vehicle, depending on setpoint signals;

a switching module designed to select one or more manual guidance signals generated by the human-control devices and/or one or more autonomous guidance signals generated by the automatic-control submodule;

an electrohydraulic valve enabling conversion of the one or more manual guidance signals and/or the one or more autonomous guidance signals into a signal intended for the hydraulic steering system; and a servo controller of the electrohydraulic valve comprising a proportional-integral controller and an on/off controller, wherein the servo controller is configured to activate the proportional-integral controller when a speed of the lift truck vehicle is less than a speed threshold of the lift truck vehicle, the speed threshold being greater than zero, and activate the on/off controller when the speed of the lift truck vehicle is greater than the speed threshold.

2. The system according to claim 1, wherein the speed threshold is fixed at 2 m/s.

3. The system according to claim 1 further comprising:

a detection module for detecting an environment of the lift truck vehicle; and a navigation module generating guidance setpoint signals, depending on a received instruction, wherein the control module includes an assisted-control submodule generating corrected manual guidance signals depending on the one or more manual guidance signals and on information from the detection module and/or on the guidance setpoint signals, and wherein the switching module is designed to select corrected manual signals.

4. The system according to claim 3, wherein the switching module selects the handling signals as a function of four operating modes:

a manual mode in which only the one or more manual guidance signals are selected;

a completely automatic mode in which only the one or more autonomous guidance signals are selected;

a manual mode with assisted security, in which the one or more manual guidance signals corrected by the information from the detection module are selected; and a manual mode with assisted navigation, in which the one or more manual guidance signals corrected by the guidance set point signals are selected.

5. The system according to claim 3, wherein the switching module can select a maintenance mode, in which all of the elements of the control system, with the exception of the human-control devices, are deactivated.

6. The system according to claim 3, wherein the navigation module is configured to telecommunicate with a remote computer.

7. The system according to claim 6, wherein the navigation module is configured to position of the lift truck vehicle to be known in real time.

8. The system according to claim 3, wherein the guidance set point signals comprise a speed set point, a truck wheel angle of rotation set point, a fork elevation set point, a fork angle of inclination set point, and a fork separation set point.

9. The system according to claim 3, wherein the detection module comprises a fork management submodule comprising:

sensors for detecting a presence of a load on forks; and fork position sensors.

10. The system according to claim 9, wherein the fork management sub-module is configured to detect an inconsistency relating to the load on the forks and for transmitting a stop signal in the event of any inconsistency.

11. The system according to claim 3, wherein the detection module comprises a submodule for detecting protection zones comprising:

at least one laser to detect a presence of an obstacle in a zone surrounding the vehicle.

12. The system according to claim 1, wherein the human-control devices are selected from the group consisting of an accelerator pedal, a brake pedal, a steering wheel, a vehicle direction of travel selector, and a lever for controlling lifting, inclination and separation of forks.

13. A lift truck vehicle comprising a control system according to claim 1.

* * * * *